July 8, 1969

J. E. ANDERSON 3,453,877

ROADWAY IRREGULARITY MARKING DEVICE

Filed Sept. 11, 1967

INVENTOR
John E. Anderson

BY Scofield, Kokjer, Scofield & Lowe
ATTORNEYS

United States Patent Office 3,453,877
Patented July 8, 1969

3,453,877
ROADWAY IRREGULARITY MARKING DEVICE
John E. Anderson, Lincoln, Nebr., assignor
to the State of Nebraska
Filed Sept. 11, 1967, Ser. No. 666,758
Int. Cl. E01c 23/00
U.S. Cl. 73—146      7 Claims

ABSTRACT OF THE DISCLOSURE

A device for detecting, measuring and recording bumps and depressions on a roadway or similar substantially flat, hard surface, as the device is advanced over the roadway and with the recordation being directly on the surface being tested. Included is a device for establishing a reference profile, a detecting and measuring means comprised essentially of a bicycle type wheel in contact with the roadway surface and mounted between two lever arms pivotally hung from the referencing device, a means for converting vertical motion of the wheel to linear motion transverse to the direction of travel of the referencing device, and a marking means that leaves a continuous trace on the roadway surface, the trace being displaced to the left or right of a preestablished reference line in an amount proportional to the elevation of the surface irregularity detected.

Summary of the invention

This invention relates to apparatus for detecting and measuring irregularities in the profile of a roadway and for recording the magnitude and location of these variations directly on said roadway. It is anticipated that this invention will be used primarily in the testing of substantially flat hard surfaced roads, but it can also be used for testing other vehicular traversable surfaces such as parking lots and airport runways.

With the advent of modern super highways a need developed for a means of evaluating roads with respect to their rideability. Engineers and highway contractors are continuously called on to provide smoother and thereby safer roads and it is imperative that there be some means for testing and measuring the smoothness of these roads. The contractor and the engineer must be able to freely communicate with each other on the subject and a quantitative method for detecting bumps and pressions in the roadway, and in particular a method which records irregularities directly on the roadway, is a valuable tool allowing the engineer to point specifically the defects in the highway with which he is concerned and with which he expects rideability to be adversely affected. The subject of this invention is a tool which meets all these requirements and is a valuable aid for establishing highway standards that will assist in providing the traveling public roads that are optimally designed for safety and comfort.

An object of the invention is to provide a visual record of irregularities in the general profile of a substantially flat roadway.

Still a further object of this invention is to provide a device for detecting, measuring, and recording irregularities in the general profile of a substantially flat hard surfaced roadway, such recordation being quantitative and being recorded directly on the surface being tested approximately at the location where the irregularity occurs.

A final object of this invention is to provide a means for evaluating rideability of roadways with respect to profile irregularities.

Other objects of the invention together with the features of novelty appurtenant thereto will appear in the course of the following description.

In the accompanying drawings, which form a part of the specification and are to be read in conjunction therewith, and in which like reference numerals indicate like parts in the various views.

Detailed description

Figure 1:
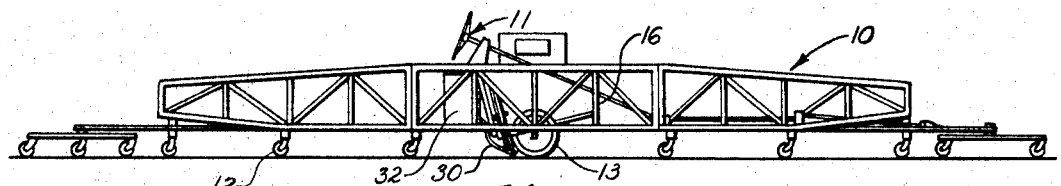
FIG. 1 is a side elevation of a preferred embodiment of the invention being operated over a flat, level roadway.

FIG. 1 shows this invention installed on a profile referencing device developed by the California Division of Highways, generally referred to as a profilograph. The profilograph consists of a 25 foot long rigid framework 10 mounted on a steerable system 11 of multiwheeled eveners 12, providing a mobile, operator controlled, reference plane describing the general profile of the roadway within the 25 foot span of the instrument. The general profile referred to is the profile of the road as designed and without elevation irregularities or surface undulations within the 25 foot span. Although the invention is shown installed on the profilographs, there are other devices, of similar nature all of which establish a reference plane and which can be used in the combination of this invention.

Figure 3:
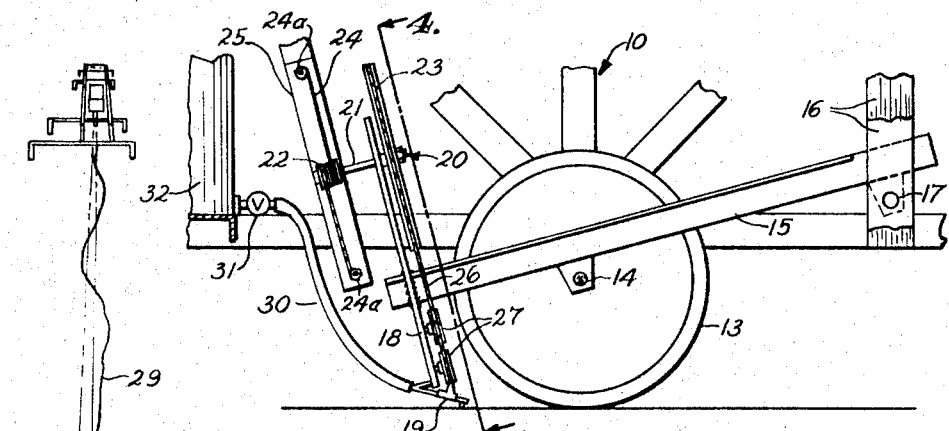
FIG. 3 is a side elevation view, greatly enlarged, of the surface detecting and marking components a fragmentary portion of the main frame also being shown.

The surface detecting and measuring device, shown in detail in FIG. 3, is comprised of a small bicycle type wheel 13 mounted on a horizontal axle 14 communicating between two parallel lever arms 15. The lever arms are fabricated from steel angles, channels or other rigid structural shapes and are pivotally supported at one end from two vertical members 16 of the rigid framework of the profilograph. The pivotal support may be of any suitable arrangement but must be such that the surface measuring and detecting device is free to pivot about a horizontal axis 17, transverse to the direction of travel of the assembly as it is advanced along the roadway. It will also be noted in FIG. 1 that, in the embodiment of this invention shown, the wheel 13 is located in the approximate longitudinal and transverse center of the profilograph. When the lever arms depend from the support members 16 at an angle of approximately 10 to 20 degrees from the horizontal, the wheel 13 peripherally contacts the roadway so that when contacting bumps or depressions in the roadway surface, pivotal motion is induced in the lever arms. The pivotal motion of the lever arms is converted to transverse linear motion of a roadway marking device, said motion being directly proportional to the magnitude of the elevation irregularity detected. The means for converting this motion will be described in greater detail later.

Figure 4:
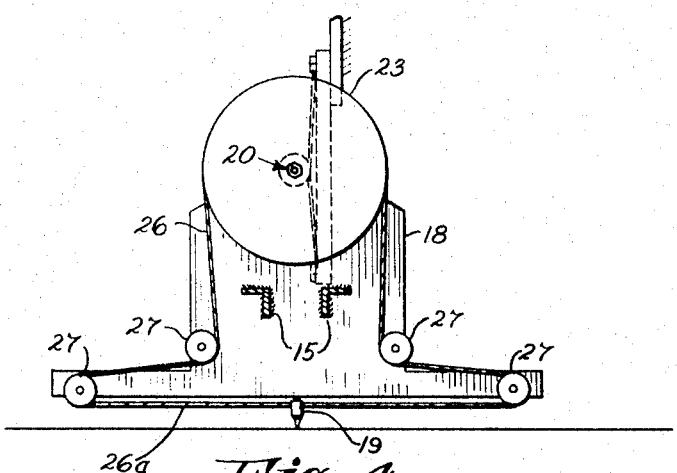
FIG. 4 is a sectional view along line 4—4 of FIG. 3 in the direction of the arrows.

A flat metal mounting plate 18 shown in FIGS. 3 and 4, is fixedly attached to the lever arms near the ends opposite the pivotal support. The plate lies perpendicular to the lengthwise dimension of the arms and is substantially shaped in the form of an inverted T. It is important to locate the lower edge of the plate in nearby relationship to the contacting point of the detecting wheel 13 so that the marking tip 19 which rides along this edge can record the data as close to the actual collection point as is practical.

Integrally mounted on the vertical centerline and near the upper edge of the mounting plate is a bearing and axle assembly 20, including an axle 21 protruding from both the front and the rear of the mounting plate. A cable drum 22, shown in FIG. 3, is mounted on the rearward end of the axle in position to translate rotational motion to a drive pulley 23 mounted on the opposing end of the axle and shown in both FIG. 3 and 4. Rotational motion of the cable drum is initiated by elevation changes of the roadway contacting wheel 13 and the angular magnitude is in a constant ratio to the magnitude of the vertical displacement of the wheel.

The cable drum is caused to rotate by its relationship to a positionally fixed cable 24. The cable is wrapped around the drum with the ends extending in opposite directions substantially in line with the pivotal path of the cable drum and fixedly attached 24a to a dependent support bar 25 rigidly supported from the profile referencing device. As the detecting wheel 13 encounters an elevation change such as a bump or depression in the roadway, the wheel 13 is caused to pivot on the pivotal axis 17 of the lever arms 15 which in turn causes the cable drum, remotely mounted on the same arms, to pivot about the same axis. Since the ends of cable 24 are fixed in relationship to the pivotal axis of the lever arms, rotational motion is induced in the cable drum 22, which is in turn transferred to the drive pulley 23 on the opposing end of the common axle 21. An endless cable 26 is trained partially around the drive pulley 23 and four direction changing pulleys 27 shown in FIG. 4 in a manner so as to convert peripheral motion of the drive pulley to horizontal linear motion in the cable.

Figure 2:
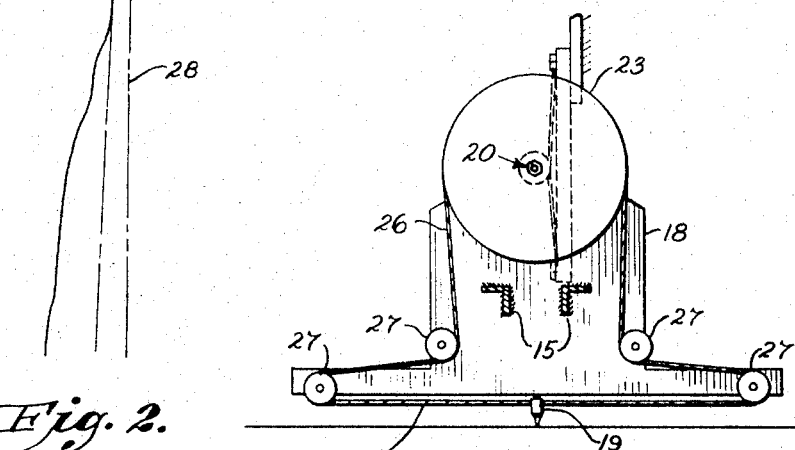
FIG. 2 shows the trace made by said embodiment recorded directly on the roadway under test and illustrates the relationship of said trace with respect to a reference line also shown in this figure, said embodiment being illustrated in rear perspective.

The horizontal segment of the cable 26a lies transverse to the direction of travel of the profile referencing device and extends along the lower edge of the mounting plate 18. A tubular marking tip 19 in marking contact with the roadway, is securely attached to the horizontal segment of the endless cable, in a position such that when the detecting wheel 13 lies even with the reference plane established by the profile referencing device, the marking tip is positioned exactly in the middle of the horizontal portion of the cable. A vertical displacement of the detecting wheel 13 thereby imparts pivotal motion to the pulley drum which is in turn translated to rotational motion of both the drum 22 and the coaxially mounted drive pulley 23. The drive pulley thereby imparts peripheral motion to the endless cable 28 which is redirected through the series of direction changing pulleys 27 to horizontal linear motion transverse to the direction of travel of the profile referencing device. This horizontal motion of the endless cable thus causes a linear displacement of the marking tip 19 which is so positioned with relationship to a preestablished reference line 28 on the roadway as shown in FIG. 2, that the linear displacement of the tip with respect to the center of the reference line is in a constant ratio to the magnitude of elevation displacement of the detecting wheel. Rises in the roadway are indicated by a displacement to one side of the line with depressions indicated by displacement to the other side.

Since this invention is designed to detect relatively small profile irregularities in a range of approximately plus or minus 1½ inches maximum and since the pivotal radii of the bicycle wheel and pulley drum is large in relationship to the magnitude of these irregularities, the amplification of the marking means is approximately equal to the ratio of the diameter of the drive pulley over the diameter of the pulley drum times the ratio of the pivotal radii of the pulley drum and the detecting wheel. In a prototype of this invention the ratio of the diameters of the drive pulley and the pulley drum was 5.25/0.725 or 7.241 while the ratio of the pivotal radii was 36/26 or 1.385 which yielded an amplification factor of 1.385 × 7.241 = 10.03. Therefore, a ½ inch rise in the roadway surface results in an approximately 5 inch displacement of the marking tip.

The marking means 19 is comprised of a hollow, dye fed tip of pliant tubular construction with fastening means for securely attaching to the horizontal segment of the endless positioning cable 26. One end of the tip contacts the roadway surface under test and is so disposed as to leave a continuous dye trace 29 on the roadway surface as shown in FIG. 2. A flexible tube 30 is attached to the opposite end of the tip and communicates between the tip and a valve 31 on the discharge port of a dye reservoir 32 mounted on the profilograph. Dye is thus fed through the tube and to the tip which thereby leaves a continuous trace directly on the roadway under test.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus fully described my invention, I claim:

1. Apparatus for detecting, measuring and recording irregularities in the general profile of a substantially flat roadway comprising
    (a) a profile referencing device movable along a reference line on said roadway,
    (b) means mounted on said device for detecting and measuring variances from the reference profile when said device is advanced over said roadway,
    (c) a roadway marking means carried by said device, and,
    (d) operating means connecting the detecting and measuring means with the roadway marking means and operable to cause said marking means to be displaced transversely with respect to said reference line in an amount proportional to the depth or height of any variation from the reference profile thereby providing a visible recorded indication of profile variations directly on said roadway.

2. Apparatus as in claim 1 wherein the means mounted on said device for detecting and measuring variations comprises
    (a) a pair of lever arms pivotally supported from said referencing device,
    (b) a roadway contacting wheel axially attached to said arms at a known distance from the pivotal support and peripherally contacting said roadway.

3. A device as in claim 1 wherein said operating means connecting the detecting and measuring device and the marking means contains
    (a) a mounting plate fixedly attached to the lever arms,
    (b) an axle and bearing assembly integrally attached to the mounting plate,
    (c) a cable drum of known diameter mounted on said axle and so disposed that vertical travel of the roadway contacting wheel results in vertical travel of said drum of known dimensional relationship to and of greater magnitude than the vertical travel of said wheel,
    (d) a cable wrapped around said drum with its ends fixedly attached to a support bar rigidly attached to the profile referencing device and so disposed that vertical motion of said drum similarly causes the drum to rotate a corresponding amount,
    (e) a drive pulley of known greater diameter than the cable drum mounted on said axle,
    (f) an endless cable in driven relationship to said drive pulley and operably connected to said marking device such that rotation of the drive pulley causes corresponding lateral movement of said marking means to either side of the said reference line dependent upon whether a depression or rise in the profile is detected, said movement being transverse to the direction of travel of the profile referencing device as it advances along the roadway thereby providing a visible line graph of profile variations directly on the roadway wherein such graph presents an amplified quantitative record of the magnitude of said profile variation.

4. A device as in claim 1 wherein the roadway marking means carried by said profile referencing device contains
 (a) a hollow, dye fed, flexible tip,
 (b) a dye supply reservoir,
 (c) a supply valve attached to the discharge port of said reservoir,
 (d) a flexible tube providing communication between said tip and said supply valve, said tip disposed immediately behind the roadway contacting wheel and in marking contact with said roadway such that as said profile referencing device advances along said referencing line, a continuous dye trace is deposited on the roadway.

5. A device as in claim 1 wherein the surface detecting and measuring means is comprised of a support mechanism pivotally mounted on the rigid framework of the profile referencing device and containing an element in contact with said roadway such that bumps and depressions in the roadway induce pivotal motion in said support mechanism.

6. A device as in claim 1 wherein the roadway marking means is comprised of a marking tip in contact with said roadway and including a continuous source of marking material such that as said device is advanced along the roadway a trace is deposited on said roadway.

7. A device as in claim 1 wherein said operating means is comprised of means to convert pivotal motion of the detecting and measuring means to transverse linear motion of the marking means wherein such linear motion is in a direct ratio to the magnitude of the surface depression or rise in said roadway causing pivotal motion in the detecting means, said ratio greater than one so that the magnitude of said surface depression or rise is amplified.

References Cited

UNITED STATES PATENTS 3,353,404   11/1967   Swift _____ 73—146

LOUIS R. PRINCE, *Primary Examiner.*

D. O. WOODIEL, *Assistant Examiner.*

U.S. Cl. X.R.

73—105